US012067398B1

(12) United States Patent
Chou et al.

(10) Patent No.: US 12,067,398 B1
(45) Date of Patent: Aug. 20, 2024

(54) SHARED LEARNING TABLE FOR LOAD VALUE PREDICTION AND LOAD ADDRESS PREDICTION

(71) Applicant: Apple Inc., Cupertino, CA (US)

(72) Inventors: Yuan C. Chou, Los Gatos, CA (US);
Debasish Chandra, Fremont, CA (US);
Mridul Agarwal, Saratoga, CA (US);
Haoyan Jia, Ellicott City, CA (US)

(73) Assignee: Apple Inc., Cupertino, CA (US)

( * ) Notice: Subject to any disclaimer, the term of this patent is extended or adjusted under 35 U.S.C. 154(b) by 162 days.

(21) Appl. No.: 17/661,491

(22) Filed: Apr. 29, 2022

(51) Int. Cl.
*G06F 9/38* (2018.01)
(52) U.S. Cl.
CPC ............ *G06F 9/3842* (2013.01); *G06F 9/383* (2013.01); *G06F 9/3832* (2013.01)
(58) Field of Classification Search
CPC .............................. G06F 9/3832; G06F 9/383
See application file for complete search history.

(56) References Cited

U.S. PATENT DOCUMENTS

| | | | |
|---|---|---|---|
| 7,856,548 B1 | 12/2010 | Nelson et al. | |
| 2002/0023204 A1* | 2/2002 | Barowski | G06F 9/383 712/240 |
| 2017/0286119 A1 | 10/2017 | Al Sheikh et al. | |
| 2019/0065384 A1 | 2/2019 | Al Sheikh et al. | |
| 2020/0364055 A1* | 11/2020 | Al Sheikh | G06F 9/3848 |
| 2021/0049015 A1* | 2/2021 | Chou | G06F 9/3861 |

OTHER PUBLICATIONS

Lipasti, M. H., Wilkerson, C. B., & Shen, J. P. (Sep. 1996). Value locality and load value prediction. In Proceedings of the seventh international conference on Architectural support for programming languages and operating systems (pp. 138-147). (Year: 1996).*
González, J., & González, A. (Jul. 1997). Speculative execution via address prediction and data prefetching. In Proceedings of the 11th international conference on Supercomputing (pp. 196-203). (Year: 1997).*
Black, B., Mueller, B., Postal, S., Rakvic, R., Utamaphethai, N., & Shen, J. P. (Jul. 1998). Load execution latency reduction. In Proceedings of the 12th international conference on Supercomputing (pp. 29-36). (Year: 1998).*

(Continued)

*Primary Examiner* — Keith E Vicary
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to load value prediction. In some embodiments, a processor includes learning table circuitry that is shared for both address and value prediction. Loads may be trained for value prediction when they are eligible for both value and address prediction. Entries in the learning table may be promoted to an address prediction table or a load value prediction table for prediction, e.g., when they reach a threshold confidence level in the training table. In some embodiments, the learning table stores a hash of a predicted load value and control circuitry uses a probing load to retrieve the actual predicted load value for the value prediction table.

20 Claims, 10 Drawing Sheets

(56) References Cited

OTHER PUBLICATIONS

Sheikh, R., Cain, H. W., & Damodaran, R. (Oct. 2017). Load value prediction via path-based address prediction: Avoiding mispredictions due to conflicting stores. In Proceedings of the 50th Annual IEEE/ACM International Symposium on Microarchitecture (pp. 423-435). (Year: 2017).*

Orosa, L., Azevedo, R., & Mutlu, O. (2018). AVPP: Address-first value-next predictor with value prefetching for improving the efficiency of load value prediction. ACM Transactions on Architecture and Code Optimization (TACO), 15(4), 1-30. (Year: 2018).*

Sato, T. (1999). Reducing miss penalty of load value prediction using load address prediction. In Proceedings of the Fourth Australasian Computer Architecture Conference, Auckland, New Zealand, Jan. 18-21, 1999. (Year: 1999).*

Sheikh, R., & Hower, D. (Feb. 2019). Efficient load value prediction using multiple predictors and filters. In 2019 IEEE International Symposium on High Performance Computer Architecture (HPCA) (pp. 454-465). IEEE. (Year: 2019).*

Wang, K., & Franklin, M. (Dec. 1997). Highly accurate data value prediction using hybrid predictors. In Proceedings of 30th Annual International Symposium on Microarchitecture (pp. 281-290). IEEE. (Year: 1997).*

Burtscher, M., & Zorn, B. G. (2002). Hybrid load-value predictors. IEEE Transactions on Computers, 51(7), 759-774. (Year: 2002).*

Burtscher, M., & Zorn, B. G. (Sep. 2000). Hybridizing and coalescing load value predictors. In Proceedings 2000 International Conference on Computer Design (pp. 81-92). IEEE. (Year: 2000).*

Sato, T. (1999). A simulation study of combining load value and address predictors. International Journal of High Speed Computing, 10(03), 25 Pages (Year: 1999).*

Sato, T. (1999). Profile-based selection of load value and address predictors. In High Performance Computing: Second International Symposium, ISHPC'99 Kyoto, Japan, May 26-28, 1999 Proceedings 2 (pp. 17-28). Springer Berlin Heidelberg. (Year: 1999).*

Reinman, G., & Calder, B. (Dec. 1998). Predictive techniques for aggressive load speculation. In Proceedings. 31st Annual ACM/IEEE International Symposium on Microarchitecture (pp. 127-137). IEEE. (Year: 1998).*

Sazeides, Y., & Smith, J. E. (Dec. 1997). The predictability of data values. In Proceedings of 30th Annual International Symposium on Microarchitecture (pp. 248-258). IEEE. (Year: 1997).*

* cited by examiner

Example learning table fields

| Status 212 | PC tag 214 | Predicted address 218 | Stride or value? 220 | Predicted stride / hash of value 222 | Striding load indicator 224 | Confidence level 226 | Allocated in prediction table? 228 | Number of consecutive mis-predictions 230 |

Example value prediction table fields

| Status 252 | PC tag 254 | Value acquired 256 | Probe sent 258 | Data 260 | LRU 262 |

Example address prediction table fields

| Status 272 | PC tag 274 | Predicted address 276 | Predicted stride 278 | Striding load indicator 280 | Intermittent striding loads 282 |

*FIG. 2*

*Example training scenarios and actions*

| Hit | Value predicted load | Striding load | Stride valid | Value match | Address match | Stride match | Tolerance | Action |
|---|---|---|---|---|---|---|---|---|
| 0 | X | X | X | X | X | X | X | Allocate, initialize CC |
| 1 | 0 | 0 | 0 | 1 | 1 | X | X | Mark as VP, increment CC |
| 1 | 0 | 0 | 0 | 0 | 1 | X | X | Increment CC |
| 1 | 0 | 0 | 1 | 0 | 1 | 1 | X | Increment CC, stride = A – last A |
| 1 | 1 | X | X | 1 | X | X | X | Increment CC |
| 1 | 0 | 1 | 1 | X | X | 1 | X | Increment CC |
| 1 | 0 | 0 | 0 | 0 | 0 | 1 | X | Establish stride, set striding load |
| 1 | 0 | 0 | 1 | X | 0 | 0 | X | Set stride valid |
| 1 | 0 | 0 | 1 | 0 | 0 | 0 | X | Clear stride valid |
| 1 | 1 | X | X | 0 | X | X | X | Clear VP, set stride valid |
| 1 | 0 | 1 | X | X | X | 0 | 0 | Hold, set tolerance |
| 1 | 0 | 1 | X | X | X | 0 | 1 | Reset, clear CC, striding load, stride valid, and tolerance |

*FIG. 3*

SHARED LEARNING TABLE FOR LOAD VALUE PREDICTION AND LOAD ADDRESS PREDICTION

BACKGROUND

Technical Field

This disclosure relates generally to computer processor architecture and more particularly to predicting the value to be retrieved for a load.

Description of the Related Art

Computer processors often use speculative execution to improve performance. For example, a branch prediction unit may predict the direction of a control transfer instruction and a processor pipeline may fetch and speculatively execute instructions based on the predicted direction. If a misprediction occurs, the processor may flush and replay the speculatively-executed instructions. Generally, there are design tradeoffs between the area and power consumed by speculative control circuitry and the performance or power benefits achieved by speculative execution. Further, flushing and replaying for inaccurate predictions may have substantial drawbacks, particularly in long pipelines.

For load instructions, a load address may be predicted and used for speculative load processing, prior to definitively determining the value or address. For example, U.S. patent application Ser. No. 16/539,684 filed Aug. 13, 2019 and titled "Early Load Execution via Constant Address and Stride Prediction" is incorporated by reference herein in its entirety. The '684 application discusses techniques for predicting load addresses and speculatively pre-fetching load values from a cache using the predicted address.

Predicting the value of a load may allow even earlier execution of the load than predicting the address of the load. The costs of traditional load value prediction, however, (e.g., circuit area, power consumption, flush/replay costs, etc.) has traditionally substantially reduced or eliminated any advantages of such prediction.

BRIEF DESCRIPTION OF THE DRAWINGS

FIG. 2 is a diagram illustrating example learning table and prediction table fields, according to some embodiments.

FIG. 3 is a diagram illustrating example actions in response to various training scenarios, according to some embodiments.

DETAILED DESCRIPTION

A load at a given program counter (PC) may be executed multiple times in fairly short succession, e.g., in a loop. Sometimes, the load address, load value, or both are the same for multiple executions of the load. If the address can be predicted, a speculative value can be fetched early from that address in a cache. If the value can be predicted, it can be speculatively provided directly to dependent instructions (e.g., while the load is still very early in the pipeline, such as in the rename stage), which may reduce the critical path of a program.

On the other hand, mispredictions may require flushes and replays starting at the mis-predicted load and prediction hardware may use chip area and consume power. Therefore, while load value prediction is a known concept in academic literature, practical implementations have been elusive.

In disclosed embodiments, prediction learning circuitry is shared for both address prediction and load prediction. This may advantageously reduce the area impacts for learning circuitry for load value prediction, relative to separate learning circuitry for value/address prediction or implementing load value prediction without address prediction.

In some embodiments, rather than storing actual load values during learning, a learning table stores an output of a function that operates on a load value (e.g., a hash function). This may reduce the area and power impact on the learning table while maintaining prediction performance. In these embodiments, a probing load may be used to retrieve the actual predicted load value when promoting an entry from the learning table to a load value prediction table.

In various embodiments, disclosed techniques for load value prediction may improve performance, reduce power consumption, or both, with limited effects on processor area.

Figure 1:
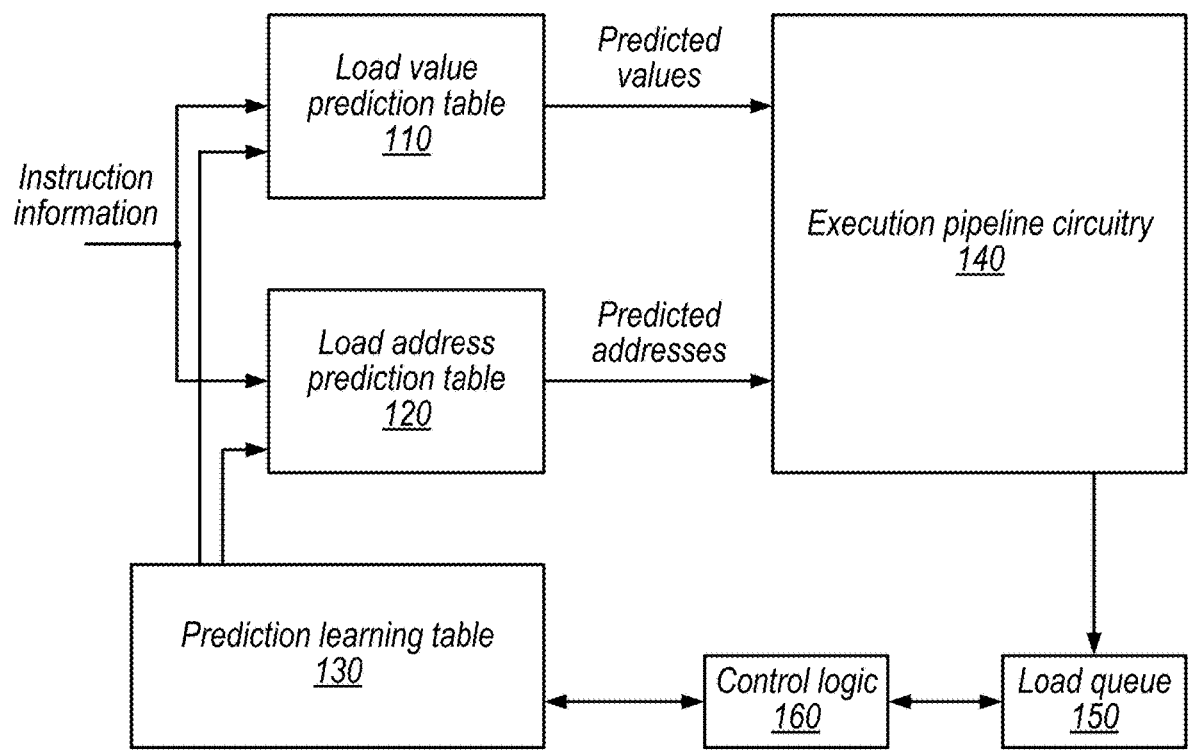
FIG. 1 is a block diagram illustrating example processor circuitry that uses a shared prediction learning table for load value prediction and load address prediction, according to some embodiments.

FIG. 1 is a block diagram illustrating example circuitry that shares a prediction learning table for load address and load value prediction, according to some embodiments. In the illustrated embodiment, a processor includes load value prediction table 110, load address prediction table 120, prediction learning table 130, execution pipeline circuitry 140, load queue 150, and control logic 160.

As shown, load value prediction table 110, in some embodiments, is configured to receive instruction information and provide predicted load values to execution pipeline circuitry 140 in some scenarios. Execution pipeline circuitry 140 may use the load values (e.g., by storing them in general-purpose registers or reservation stations) for speculative execution. This may allow younger dependent instructions to proceed sooner (speculatively executing using the predicted load value), which may improve performance.

Similarly, load address prediction table 120 may be configured to receive instruction information and provide predicted address values to execution pipeline circuitry 140. Execution pipeline circuitry 140 may use the predicted addresses to pre-fetch load data (e.g., from a cache) for speculative execution, prior to performing one or more operations to definitively determine the actual load address.

Load queue 150 is configured to queue load operations until they are completed. Once a load is completed (e.g., the data for its source location is read from a cache or memory or forwarded from another instruction), load queue 150 may provide the actual load value to control logic 160.

Control logic 160, in some embodiments, is configured to verify whether the actual load value matches the predicted load value. If not, control logic 160 may initiate a flush and replay due to the misprediction. Control logic 160 may also control prediction learning table 130 in order to update prediction for subsequent instructions.

Prediction learning table 130, in the illustrated embodiment, is shared by both load value prediction table 110 and load address prediction table 120. In some embodiments, prediction learning table 130 is configured to track entries for multiple loads (e.g., based on at least a portion of their program counter) and promote entries to tables 110 and 120 when they reach a confidence threshold. Sharing the prediction learning table may advantageously reduce processor area, in some embodiments.

Detailed example entry fields for tables 110, 120, and 130 are discussed in detail below, as well as example control techniques for training and prediction.

FIG. 2 is a block diagram illustrating example fields for multiple tables, according to some embodiments. Note that the illustrated fields are included for purposes of explanation but are not intended to limit the present disclosure. In other embodiments, fields may be omitted or added, encoded differently, etc.

In the illustrated example, the learning table 130 includes the following fields: status 212, PC tag 214, predicted address 218, stride or value 220, predicted stride/hash of value 222, striding load indicator 224, confidence level 226, allocated in prediction table 228, and number of consecutive mis-predictions 230.

The status field 212 may indicate one or more of a valid bit, an age, a priority level, and so forth. The PC tag 214 includes all or a portion of the program counter used to identify the corresponding load instruction. The PC tag 214 may also use a hash value derived from a program counter, in some embodiments. Fields 212 and 214 may be used to determine hits and misses.

In the illustrated example, field 218 stores the predicted address. Field 220 indicates whether field 222 stores a predicted stride or a hash of a predicted value, in this embodiment. Note that this may also indicate whether an entry is being trained for value prediction (although a separate field may encode that information in other embodiments). Field 222 stores the predicted stride if training for address prediction, or predicted load value information (e.g., a predicted value or hash of a predicted value) if training for value prediction. In some embodiments, stride and predicted load value information may be stored in separate fields (e.g., to train a given entry for both address and value prediction at the same time), although this may increase the size of the learning table.

In the illustrated example, field 224 stores an indication specifying whether the load instruction is a strided load instruction. If so, in some embodiments, the field 218 stores a base address and the field 222 stores the next predicted stride based on the base address. Field 226 indicates a level of confidence that the load address/value can be accurately predicted. Once the level of confidence meets a threshold, the entry may be promoted to one of the prediction tables. Field 228 indicates whether the load is allocated in a prediction table (which may signal that the entry is eligible to be allocated for another load if needed). Field 230 stores a count of consecutive address mispredictions. When the count stored in the field 230 exceeds a threshold, in some embodiments, table entries in each of the prediction table and the learning table are invalidated for the corresponding load instruction.

In the illustrated example, the value prediction table includes the following fields: status 252, PC tag 254, value acquired 256, probe sent 258, data 260, and LRU 262.

Note that the status 252 and PC tag 254 may correspond to similar fields in the prediction table and these fields may be used to detect hits and misses.

Value acquired field 256, in the illustrated embodiment, indicates whether the predicted load value is present in the value prediction table. If it is not, in response to a hit in the value prediction table, control circuitry marks the load associated with the hit as a probing load and retrieves the value when the probing load completes. The probe sent field 258 indicates whether a probing load has been sent (e.g., to avoid sending a second probing load if a probing load for the entry is already in-flight).

Data field 260 holds the predicted load value (e.g., once retrieved from a probing load). LRU 262 indicates least-recently-used or pseudo-LRU information that control circuitry may use to determine which entry to evict to make room for a new entry to be promoted from the learning table.

In some embodiments, prediction circuitry may track consistently changing load values (e.g., increments by 1) for value prediction similarly to tracking stride values for address prediction. In those embodiments, the training and prediction tables may include fields for value increment and whether a load value is being incremented.

In the illustrated example, the address prediction table includes the following fields: status 272, PC tag 274, predicted address 276, predicted stride 278, striding load indicator 280, and intermittent striding loads 282.

Note that fields 272, 274, 276, 278, and 280 may correspond to similarly-named fields for the learning table. The intermitted striding loads field 282, in the illustrated embodiment, stores an indication specifying whether there is a non-zero number of intermittent strided load instructions with a same program counter (PC) between an oldest strided load instruction causing allocation of an entry in the load prediction table and a youngest strided load instruction accessing the load prediction table after the allocation. Note that multiple fields may be used to store this identification in other embodiments. Detailed control logic to handle address prediction based on field 282 is described in the '684 application.

FIG. 3 is a diagram illustrating example training scenarios and actions, according to some embodiments. In the illustrated example, the rows shown using bold text are particularly relevant to load value prediction. Generally, a "0" entry corresponds to a false input, a "1" entry corresponds to a true input, and an "X" entry denotes that the value is not considered.

In the first row, if there is not a hit in the learning table for a load, control circuitry allocates an entry in the learning table and initializes the confidence counter (e.g., to an initial value of zero if counting up, in some embodiments) and may initialize various other fields. This may allow the learning table to begin training for the load.

In the second row, if there is a hit for the load and the value of the load matches field 220 of the entry that was hit, control circuitry marks the load as a value predicted load (e.g., using field 220) and increments the confidence counter. Note that this implementation may prioritize load value prediction over load address prediction by training for value rather than address if training for both are feasible.

The third and fourth rows show example actions for loads that are an address match and not a value match. In particular, the confidence counter is incremented for the situation in row 3 and the confidence counter is incremented and the stride is set (as the current address minus the last address) for the situation in row 4.

In the fifth row, if there is a hit for a learning table entry that is already marked as a value predicted load, control circuitry increments the confidence counter.

The sixth through ninth rows show example actions for loads that are hits and are address predicted or have various stride scenarios. In particular, the confidence counter is incremented for the situation in row 6, the stride is established and the load is set to be trained as a striding load for the situation in row 7, the stride is set as valid for the situation in row 8 and the stride valid indicator is cleared for the situation in row 8.

In the tenth row, if there is a hit for a learning table entry that is a value predicted load but there is not a value match, control circuitry clears the value predicted field (e.g., using field 220) and sets the stride to valid.

The eleventh and twelfth rows show example actions for tolerance in order to handle intermittent striding loads for address prediction. In particular an entry is held and tolerance is set for the situation in row 11 and following fields are cleared for the situation in row 12: confidence counter, striding load, stride valid, and tolerance.

Figure 4:
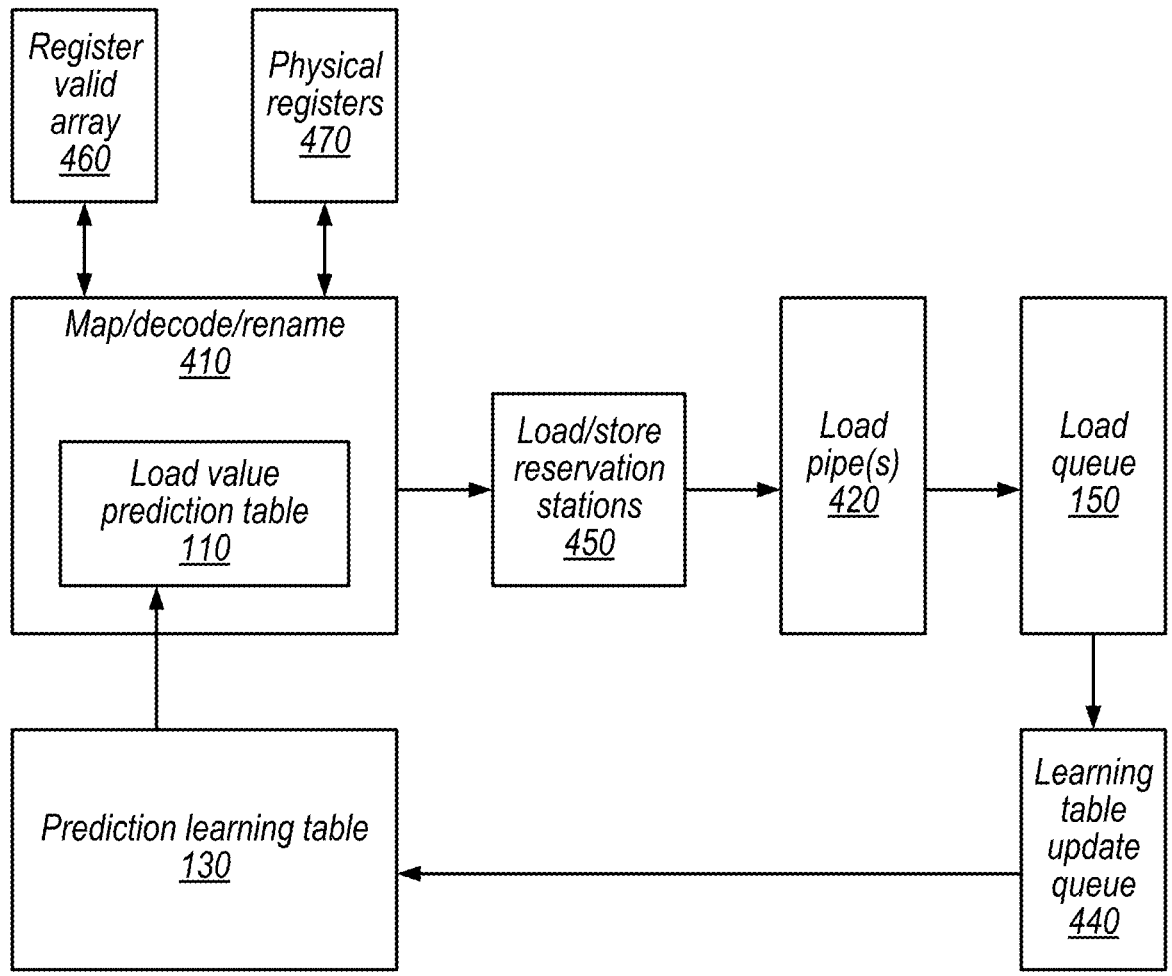
FIG. 4 is a diagram illustrating example circuitry that may use load value prediction for speculative execution, according to some embodiments.

FIG. 4 is a block diagram illustrating example circuitry configured to use predicted load values, according to some embodiments. In the illustrated example, a processor includes map/decode/rename (MDR) circuitry 410, load pipe(s) 420, load queue 150, learning table update queue 440, prediction learning table 130, load/store reservation stations 450, register valid array 460, and physical registers 470. Note that similarly numbered elements may operate as described above with reference to other figures.

MDR circuitry 410, in the illustrated embodiment, includes the load value prediction table. In some embodiments, MDR 410 is configured to store predicted load values in a physical register. In some embodiments, MDR 410 is configured to store predicted load values in a load/store reservation station. This may allow subsequent instructions to speculatively proceed using the predicted values. MDR 410 may use the register valid array 460 to indicate when a register value is valid for use by other instructions, in some embodiments.

In some embodiments, storing the predicted value in a reservation station may reduce use or register file read ports and may allow faster access to the predicted data for validation against an actual load address, for example. Note that use of reservation stations is a well-understood technique that facilitates register renaming. Reservation stations allow use of data values without waiting for them to be stored in a register and re-read (e.g., instructions can designate one or more reservation stations from which to read their input(s)). Instructions may be stalled until their inputs are ready and then scheduled for execution.

Load pipe(s) 420, in the illustrated embodiment, include pipeline stages configured to process load instructions and provide information to load queue 150. Learning table update queue 440, in some embodiments, allows a rate mismatch between load queue entries that are retired and how quickly the learning table is updated. The learning table update queue may include a field to store a hash of a predicted load value or a predicted load value itself, for use by control circuitry to update the prediction learning table.

Figure 5:
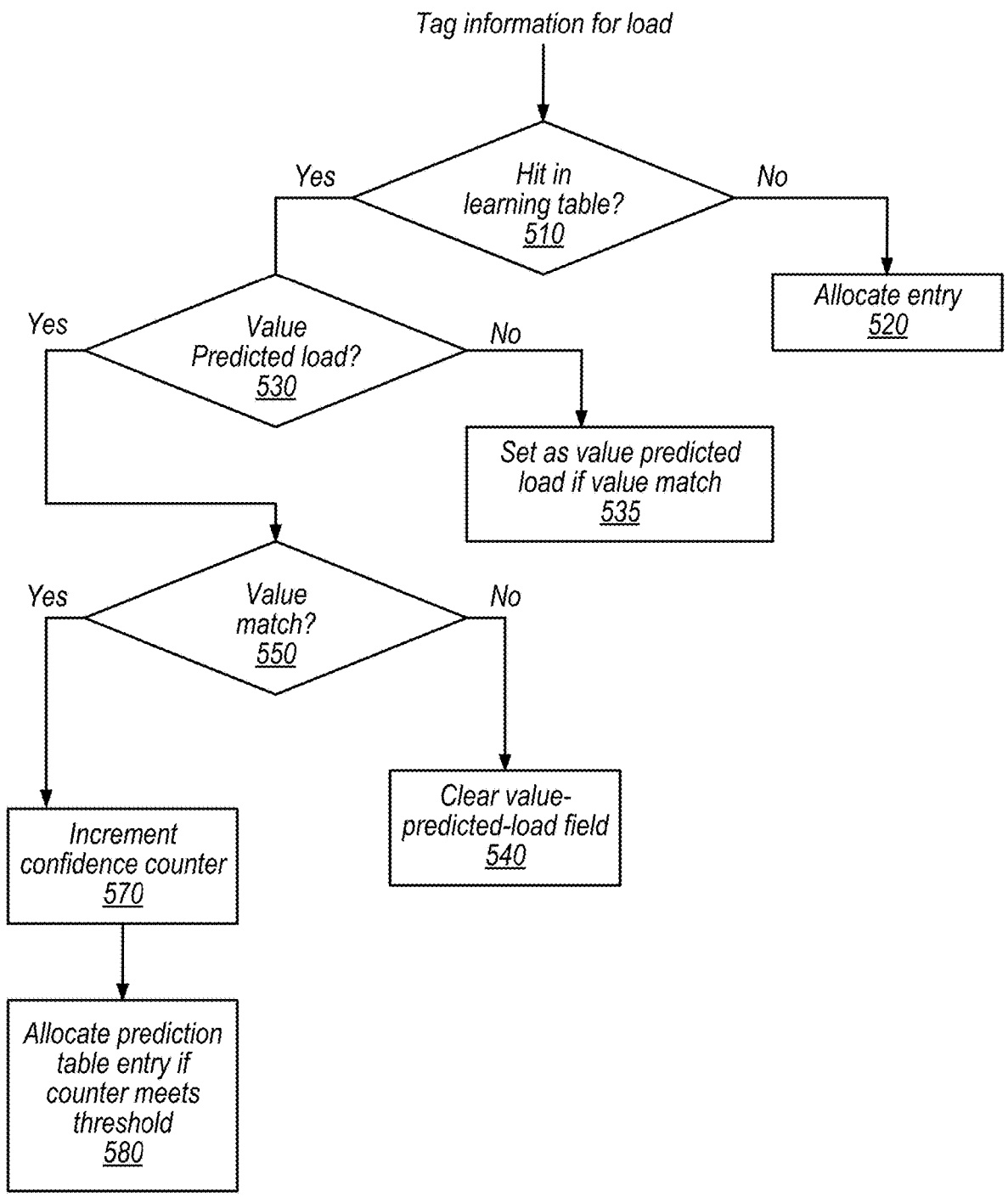
FIG. 5 is a flow diagram illustrating example training operations, according to some embodiments.

FIG. 5 is a flow diagram illustrating an example training technique, according to some embodiments. At 510, in the illustrated embodiment, control circuitry receives tag information for a load (e.g., all or a portion of its program counter and any other identifying information) and determines whether there is a hit in the learning table. If not, the control circuitry allocates an entry in the learning table at 520. If there is a hit, flow proceeds to 530 and the control circuitry determines whether the entry indicates a value predicted load.

If the load is not a value predicted load and there is a value match, the control circuitry sets the entry to reflect a value predicted load. Otherwise, flow proceeds to 550 and the control circuitry determines if there is a value match. If not, the control circuitry clears the value predicted load field at 540. If there is a value match at 550, the control circuitry increments the confidence counter at 570. At 590, if the confidence counter meets a threshold, the control circuitry allocates an entry in the prediction table 110 based on information in the learning table entry.

Figure 6:
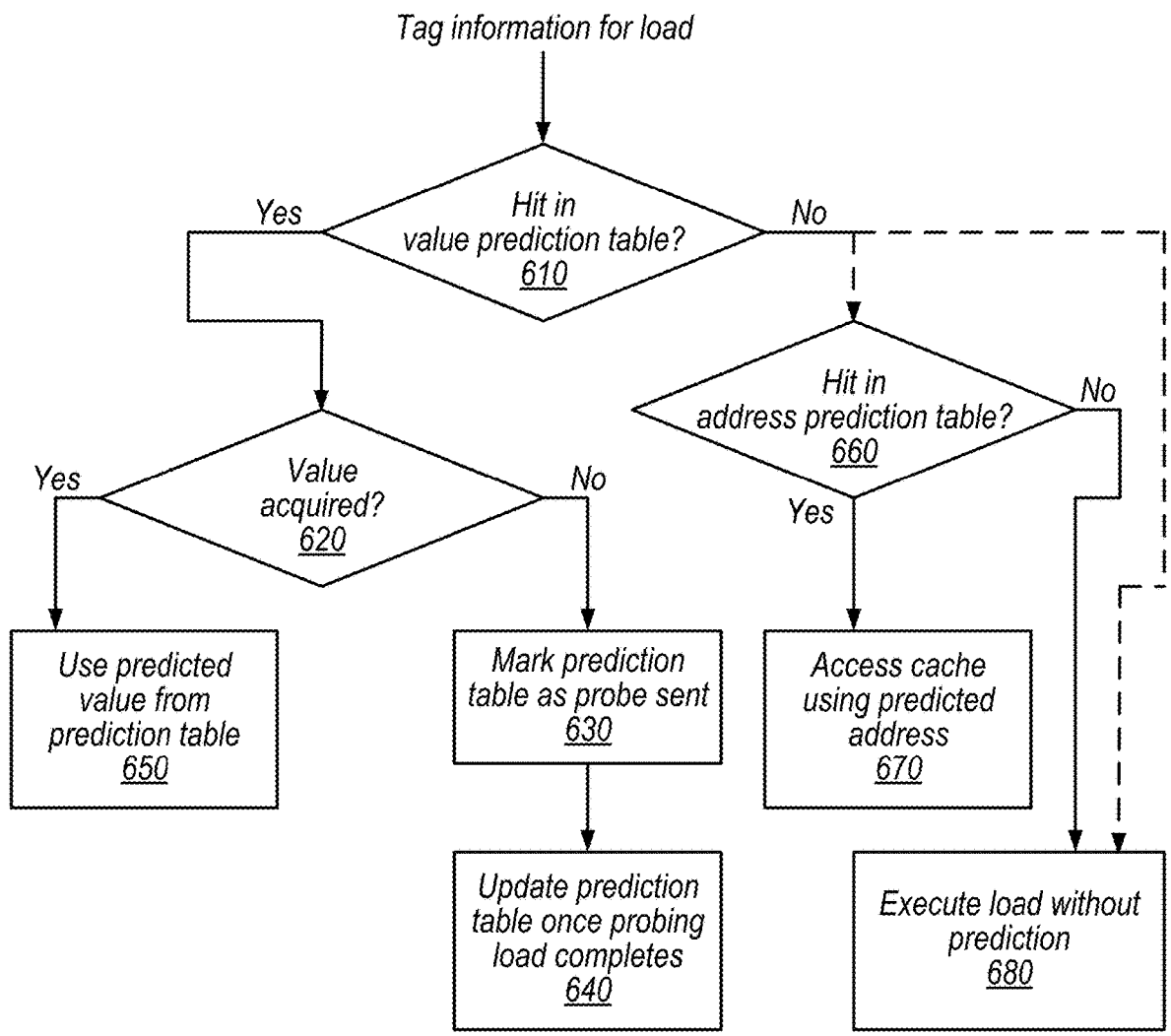
FIG. 6 is a flow diagram illustrating example prediction operations, according to some embodiments.

FIG. 6 is a flow diagram illustrating an example prediction technique, according to some embodiments. At 610, in the illustrated embodiment, control circuitry receives tag information for a load and determines whether there is a hit in the value prediction table. If so, flow proceeds to 620 and the control circuitry determines if a value for the load has been acquired. In other embodiments without hashing or probing loads, flow may proceed directly from element 610 to element 650 when there is a hit.

At 620, if the value has been acquired, the control circuitry uses the prediction value from the prediction table at 650. If the value has not been acquired, flow proceeds to 630 where the load is sent as a probing load to get the value and the control circuitry marks the prediction table to indicate that the probe was sent. At 640, the control circuitry updates the prediction table with the load value from the probing load, once it completes.

If there is not a hit at 610, flow proceeds to 660 (or alternatively, in embodiments without address prediction, flow proceeds to 680 as shown by the dashed arrow). At 660, the control circuitry determines if there is a hit in the address prediction table (note that this determination may be performed in parallel with element 610, in some implementations). If so, the control circuitry accesses a cache using the predicted address at 670. If not, the load is executed normally (without prediction) at 680.

Note that in some embodiments, load value prediction may be implemented without address prediction. Various disclosed techniques may be utilized in this context to improve performance or reduce circuit area and power consumption, such as the prediction table storing a hash of the predicted value and probing load techniques to retrieve the actual value.

Figure 7:
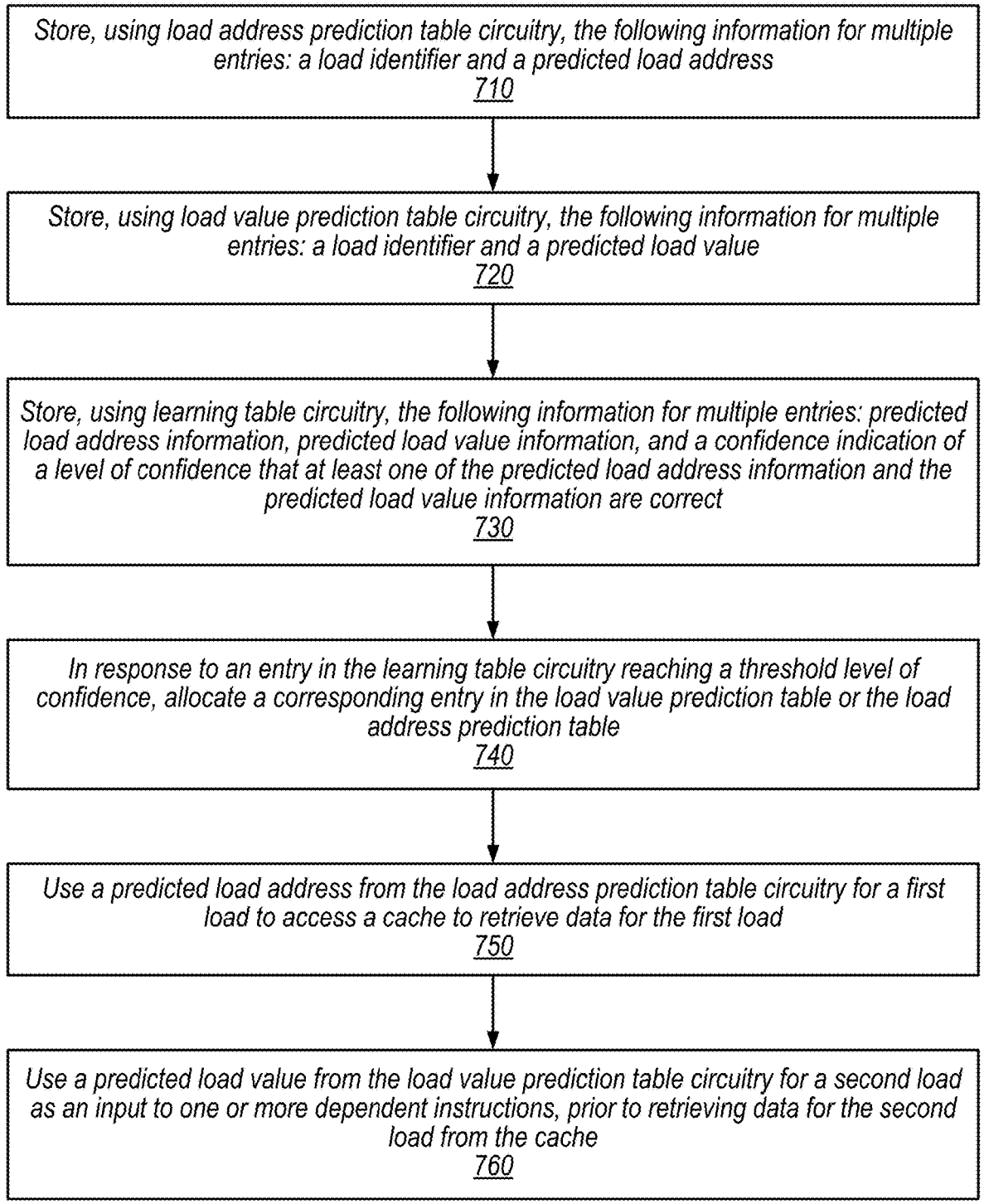
FIG. 7 is a flow diagram illustrating an example method, according to some embodiments.

FIG. 7 is a flow diagram illustrating an example method for load value prediction, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, load address prediction table circuitry stores the following information for multiple entries: a load identifier and a predicted load address.

At 720, in the illustrated embodiment, load value prediction table circuitry stores the following information for multiple entries: a load identifier and a predicted load value.

At 730, in the illustrated embodiment, learning table circuitry (that is shared for load address prediction and load value prediction) stores the following information for multiple entries: predicted load address information, predicted load value information, and a confidence indication of a level of confidence that at least one of the predicted load address information and the predicted load value information are correct.

As used herein, the term "predicted load value information" refers to a predicted load value itself or to the output of a function (e.g., a hash function) that operates on the predicted load value as an input.

Therefore, in some embodiments the predicted load value information in the learning table circuitry is a hash of a predicted load value. As discussed above, using a hash value of the predicted load value information may reduce the size of the learning table relative to storing a full predicted value. In some embodiments, in response to a third load that hits a first entry in the load value prediction table circuitry, when the first entry has not populated its predicted load value, the control circuitry is configured to mark the third load as a probing load and retrieve a predicted load value to the load value prediction table using a load value from the probing load.

In some embodiments, entries of the learning table circuitry include a field that indicates whether a given entry is being trained for load value prediction or load address prediction (e.g., field 220). In some embodiments, the learning table circuitry is configured to use the field for predicted load value information (e.g., field 222) for a predicted address stride for entries that are being trained for load address prediction.

In some embodiments, for a load that is a candidate for both load address prediction and load value prediction, the learning table circuitry is configured to configure an entry for the load for load value prediction.

At 740, in the illustrated embodiment, control circuitry allocates, in response to an entry in the learning table circuitry reaching a threshold level of confidence, a corresponding entry in the load value prediction table or the load address prediction table. For example, in embodiments where a given entry in the learning table is trained for either value prediction or address prediction at a given time (but not both), the appropriate table may be targeted.

At 750, in the illustrated embodiment, pipeline circuitry uses a predicted load address from the load address prediction table circuitry for a first load to access a cache to retrieve data for the first load.

At 760, in the illustrated embodiment, pipeline circuitry uses a predicted load value from the load value prediction table circuitry for a second load as an input to one or more dependent instructions, prior to retrieving data for the second load from the cache.

In some embodiments, the pipeline circuitry is configured to store the predicted load value for the second load in a physical register. In some embodiments, the pipeline circuitry is configured to store the predicted load value for the second load in a load reservation station.

Example Device

Figure 8:
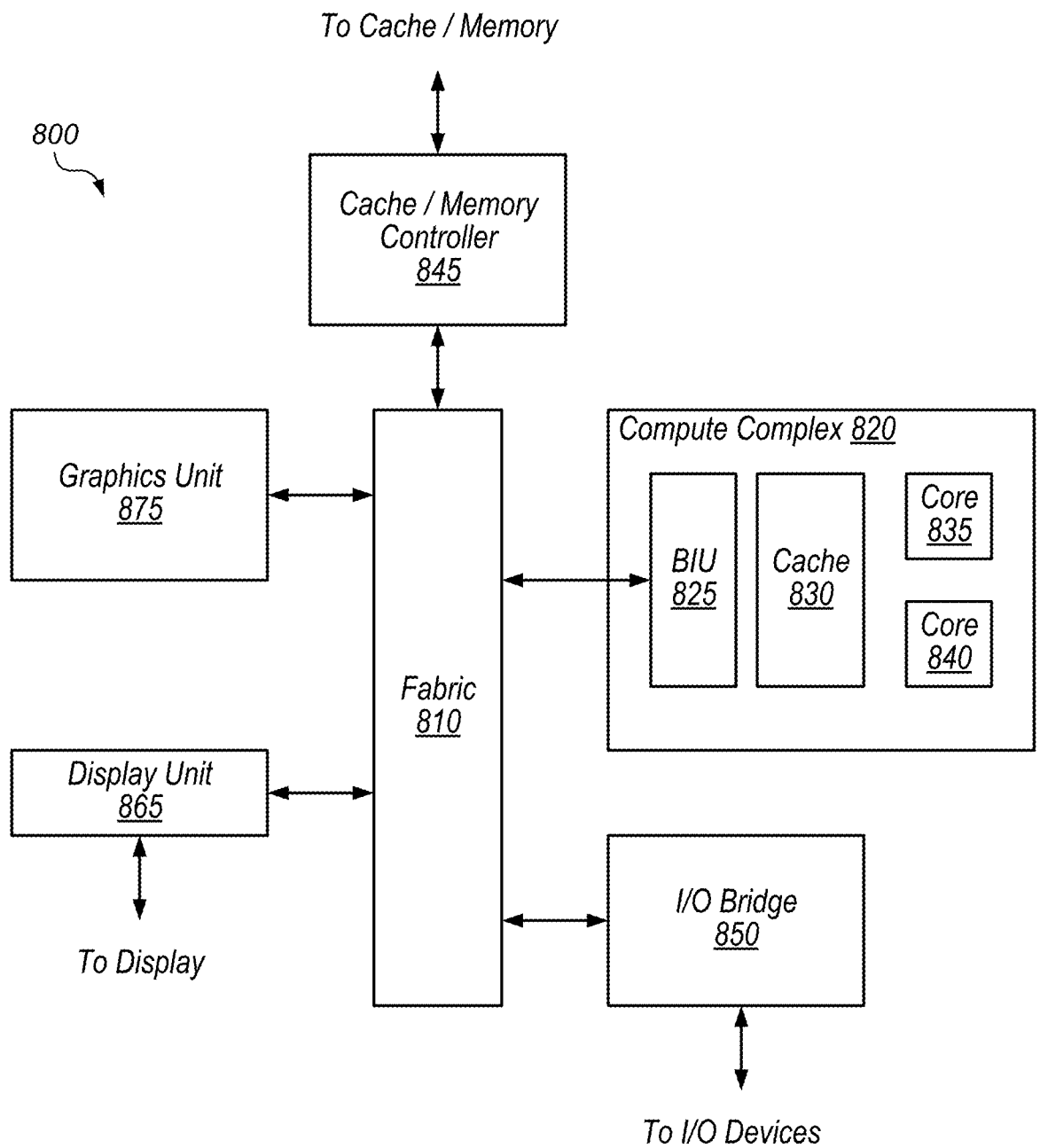
FIG. 8 is a block diagram illustrating an example computing device, according to some embodiments.

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820, input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Disclosed load value prediction techniques may be implemented in a core of compute complex 820 or in graphics unit 875, for example, and may improve performance or reduce power consumption of those elements, in some embodiments.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Graphics unit 875 may include one or more processors, e.g., one or more graphics processing units (GPU's). Graphics unit 875 may receive graphics-oriented instructions, such as OPENGL®, Metal, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 800 with connectivity to various types of other devices and networks.

Example Applications

Figure 9:
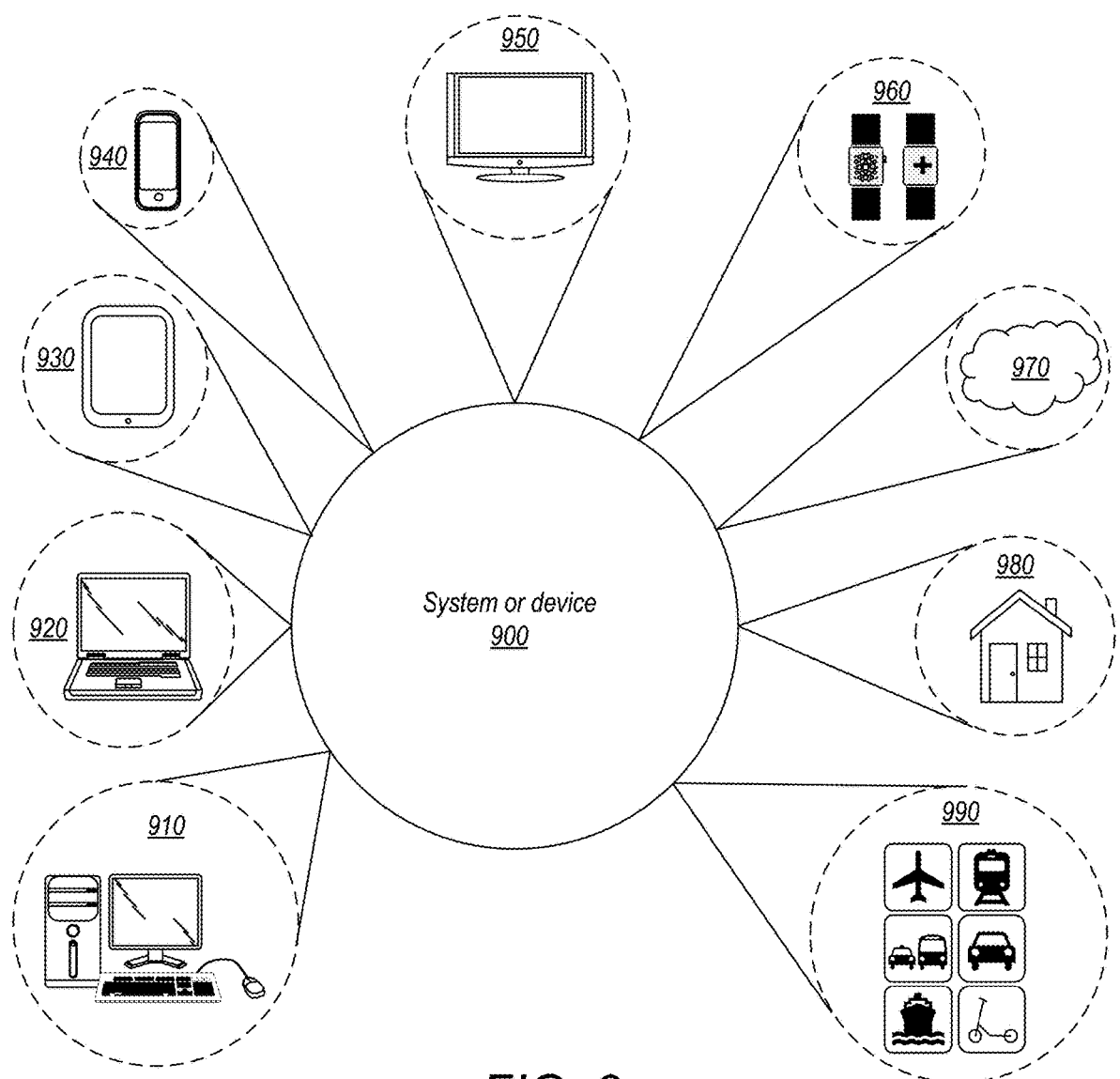
FIG. 9 is a diagram illustrating example applications of disclosed systems and devices, according to some embodiments.

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 10:
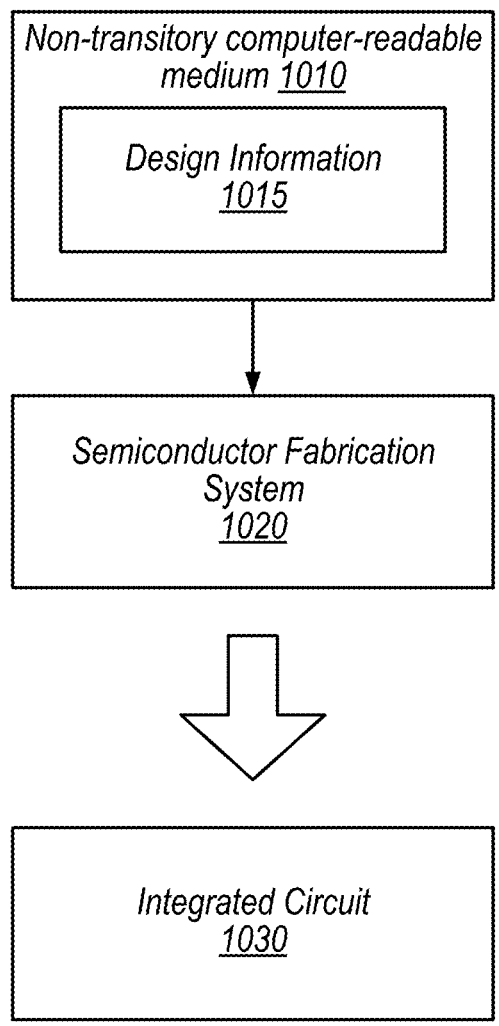
FIG. 10 is a block diagram illustrating an example computer-readable medium that stores circuit design information, according to some embodiments.

FIG. 10 is a block diagram illustrating an example non-transitory computer-readable storage medium that stores circuit design information, according to some embodiments. In the illustrated embodiment semiconductor fabrication system 1020 is configured to process the design information 1015 stored on non-transitory computer-readable medium 1010 and fabricate integrated circuit 1030 based on the design information 1015.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Non-transitory computer-readable storage medium 1010 may include two or more memory mediums which may reside in different locations, e.g., in different computer systems that are connected over a network.

Design information 1015 may be specified using any of various appropriate computer languages, including hardware description languages such as, without limitation: VHDL, Verilog, SystemC, SystemVerilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system 1020. In some embodiments, design information 1015 may also include one or more cell libraries which specify the synthesis, layout, or both of integrated circuit 1030. In some embodiments, the design information is specified in whole or in part in the form of a netlist that specifies cell library elements and their connectivity. Design information 1015, taken alone, may or may not include sufficient information for fabrication of a corresponding integrated circuit. For example, design information 1015 may specify the circuit elements to be fabricated but not their physical layout. In this case, design information 1015 may need to be combined with layout information to actually fabricate the specified circuitry.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown in FIGS. 1, 4, and 8. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   hardware load address prediction table circuitry configured to store the following information for multiple entries: a load identifier and a predicted load address;
   hardware load value prediction table circuitry configured to store the following information for multiple entries: a load identifier and a predicted load value;
   hardware learning table circuitry shared for load address prediction and load value prediction, wherein the hardware learning table circuitry is configured to store the following information for multiple entries: first predicted load address information, first predicted load value information, and a confidence indication of a level of confidence that at least one of the first predicted load address information and the first predicted load value information are correct;
   hardware control circuitry configured to, in response to an entry in the hardware learning table circuitry reaching a threshold level of confidence, allocate a corresponding entry in either the hardware load value prediction table circuitry or the hardware load address prediction table circuitry; and hardware pipeline circuitry configured to:
use a predicted load address from the hardware load address prediction table circuitry for a first load to access a cache to retrieve data for the first load; and
use a predicted load value from the hardware load value prediction table circuitry for a second load as an input to one or more dependent instructions, prior to retrieving data for the second load from the cache.

2. The apparatus of claim 1, wherein the first predicted load value information in the hardware learning table circuitry is a hash of a predicted load value.

3. The apparatus of claim 2, wherein, in response to a third load that hits a first entry in the hardware load value prediction table circuitry, when a predicted load value of the first entry is not populated, the hardware control circuitry is configured to mark the third load as a probing load and retrieve a predicted load value to the hardware load value prediction table circuitry using a load value from the probing load.

4. The apparatus of claim 1, wherein the hardware pipeline circuitry is configured to store the predicted load value for the second load in a physical register.

5. The apparatus of claim 1, wherein the hardware pipeline circuitry is configured to store the predicted load value for the second load in a load reservation station.

6. The apparatus of claim 1, wherein entries of the hardware learning table circuitry include a field that indicates whether a given entry is being trained for load value prediction or is being trained for load address prediction.

7. The apparatus of claim 6, wherein the hardware learning table circuitry is configured to:
use a first field to store predicted load value information for entries that are being trained for load value prediction; and
use the first field to store a predicted address stride for entries that are being trained for load address prediction.

8. The apparatus of claim 6, wherein, for a load that is a candidate for both load address prediction and load value prediction, the hardware learning table circuitry is configured to configure an entry for the load for load value prediction.

9. The apparatus of claim 1, wherein the apparatus is a computing device that further includes:
a central processing unit;
a display; and
hardware network interface circuitry.

10. A method, comprising
storing, in a load address prediction table by a processor, the following information for multiple entries: a load identifier and a predicted load address;
storing, in a load value prediction table by the processor, the following information for multiple entries: a load identifier and a predicted load value;
sharing, by the processor, learning table circuitry for load address prediction and load value prediction, wherein the sharing includes storing the following information for multiple entries: first predicted load address information, first predicted load value information, and a confidence indication of a level of confidence that at least one of the first predicted load address information and the first predicted load value information are correct;

in response to an entry in the learning table circuitry reaching a threshold level of confidence, the processor allocating a corresponding entry in either the load value prediction table or the load address prediction table;
using, by the processor, a predicted load address from the load address prediction table for a first load to access a cache to retrieve data for the first load; and
using, by the processor, a predicted load value from the load value prediction table for a second load as an input to one or more dependent instructions, prior to retrieving data for the second load from the cache.

11. The method of claim 10, wherein the first predicted load value information in the learning table circuitry is a hash of a predicted load value, the method further comprising:
in response to a third load that hits a first entry in the load value prediction table, when a predicted load value of the first entry is not populated, marking the third load as a probing load and retrieving a predicted load value to the load value prediction table using a load value from the probing load.

12. The method of claim 10, further comprising storing the predicted load value for the second load in a physical register or a reservation station.

13. The method of claim 10, wherein entries of the learning table circuitry include a field that indicates whether a given entry is being trained for load value prediction or is being trained for load address prediction.

14. The method of claim 13, further comprising:
for a load that is a candidate for both load address prediction and load value prediction, configuring an entry in the learning table circuitry for load value prediction.

15. A non-transitory computer readable storage medium having stored thereon design information that specifies a design of at least a portion of a hardware integrated circuit in a format recognized by a semiconductor fabrication system that is configured to use the design information to produce the hardware integrated circuit according to the design, wherein the design information specifies that the hardware integrated circuit includes:
load address prediction table circuitry configured to store the following information for multiple entries: a load identifier and a predicted load address;
load value prediction table circuitry configured to store the following information for multiple entries: a load identifier and a predicted load value;
learning table circuitry shared for load address prediction and load value prediction, wherein the learning table circuitry is configured to store the following information for multiple entries: first predicted load address information, first predicted load value information, and a confidence indication of a level of confidence that at least one of the first predicted load address information and the first predicted load value information are correct;
control circuitry configured to, in response to an entry in the learning table circuitry reaching a threshold level of confidence, allocate a corresponding entry in either the load value prediction table circuitry or the load address prediction table circuitry; and
pipeline circuitry configured to:
use a predicted load address from the load address prediction table circuitry for a first load to access a cache to retrieve data for the first load; and
use a predicted load value from the load value prediction table circuitry for a second load as an input to one or more dependent instructions, prior to retrieving data for the second load from the cache.

16. The non-transitory computer readable storage medium of claim 15, wherein the first predicted load value information in the learning table circuitry is a hash of a predicted load value.

17. The non-transitory computer readable storage medium of claim 16, wherein, in response to a third load that hits a first entry in the load value prediction table circuitry, when a predicted load value of the first entry is not populated, the control circuitry is configured to mark the third load as a probing load and retrieve a predicted load value to the load value prediction table circuitry using a load value from the probing load.

18. The non-transitory computer readable storage medium of claim 15, wherein entries of the learning table circuitry include a field that indicates whether a given entry is being trained for load value prediction or is being trained for load address prediction.

19. The non-transitory computer readable storage medium of claim 18, wherein the learning table circuitry is configured to:
use a first field to store predicted load value information for entries that are being trained for load value prediction; and
use the first field to store a predicted address stride for entries that are being trained for load address prediction.

20. The non-transitory computer readable storage medium of claim 18, wherein, for a load that is a candidate for both load address prediction and load value prediction, the learning table circuitry is configured to configure an entry for the load for load value prediction.

* * * * *